UNITED STATES PATENT OFFICE.

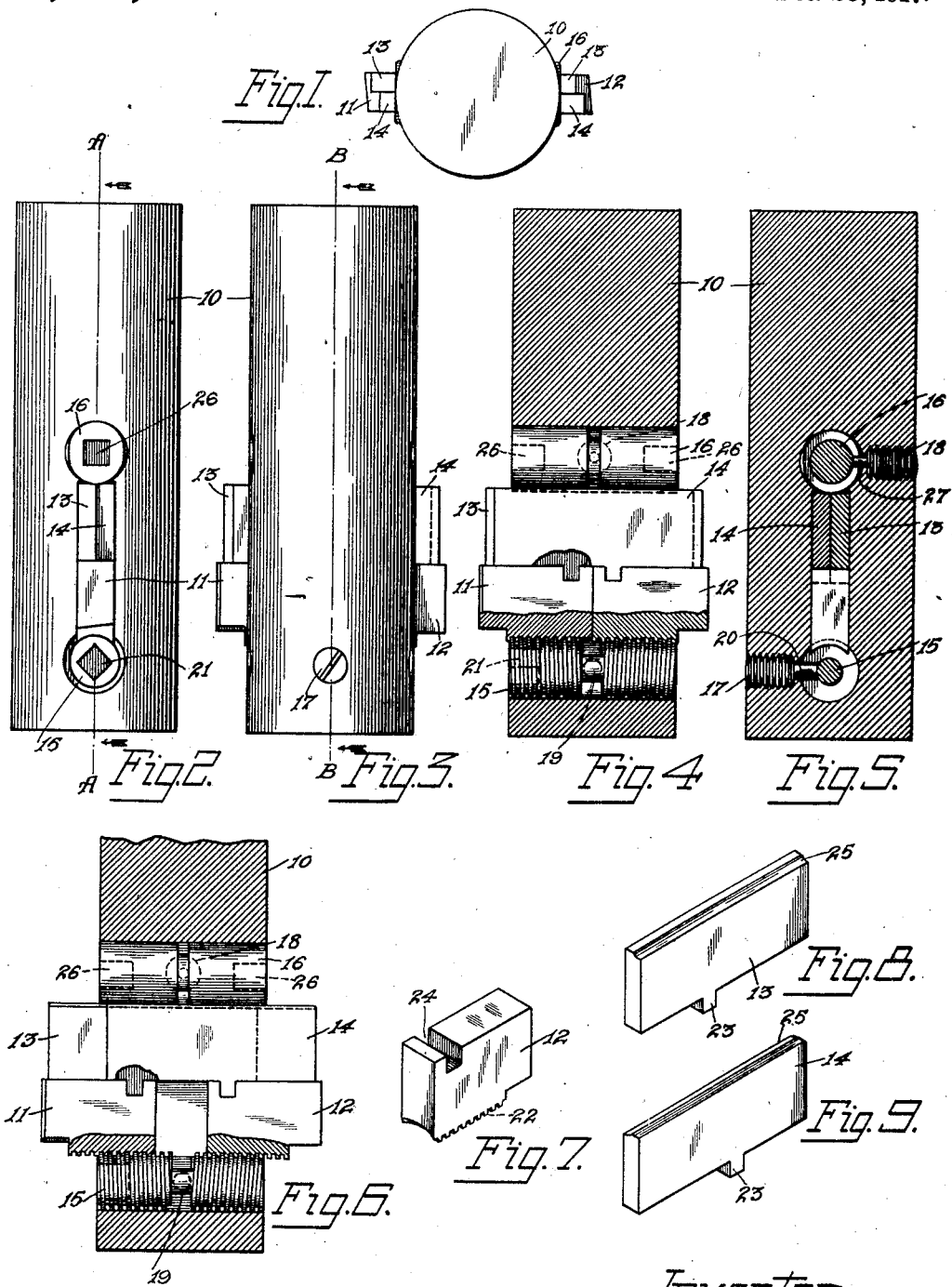
J. VAN DER VORN.
BORING TOOL.
APPLICATION FILED JUNE 18, 1917.
1,251,139. Patented Dec. 25, 1917.

JACOB VAN DER VORN, OF CHICAGO, ILLINOIS, ASSIGNOR TO EXPANDEM TOOL AND MANUFACTURING COMPANY, A CORPORATION OF ILLINOIS.

BORING-TOOL.

1,251,139.  Specification of Letters Patent.  Patented Dec. 25, 1917.

Application filed June 18, 1917. Serial No. 175,284.

*To all whom it may concern:*

Be it known that I, JACOB VAN DER VORN, a citizen of the United States, residing at Chicago, county of Cook, and State of Illinois, have invented certain new and useful Improvements in Boring-Tools, of which the following is a specification.

The present invention relates to boring tools for metal working and especially to boring tools of the expansion type, wherein the cutter-holding bar is provided with cutters which are adjustable toward and from the axis of the bar to vary the diameter of the cut.

The principal object of the invention is to provide improved means for supporting and adjusting the cutters in the bar with a view to increasing the rigidity of the cutters for all operative adjustments and to readily obtaining the desired expansion when in service. Other objects include economy and simplicity of construction, efficiency of operation at high speeds, and neatness of appearance and finish.

The present invention is an improvement upon that disclosed in my Patent No. 1,232,411, granted July 3, 1917.

With these general objects in view, the invention will be more fully understood upon reference to the following detailed description taken in connection with the accompanying drawing, and the scope of the invention will be particularly pointed out in the appended claims.

In the drawing, Figure 1 is an end view of a boring tool constructed in accordance with the present invention; Fig. 2 is an elevation of the same viewed in the direction of the cutters; Fig. 3 is a similar elevation viewed at right angles to the view of Fig. 2; Fig. 4 is a vertical section taken on a plane indicated by the line A—A of Fig. 2; Fig. 5 is a similar section taken on a plane indicated by the line B—B of Fig. 3; Fig. 6 is a view similar to Fig. 4, illustrating the parts in expanded position; Fig. 7 is a perspective view of one of the cutters; and Figs. 8 and 9 are perspective views of the follower clamping blocks, respectively.

Throughout these views, like characters refer to like parts.

In brief, the complete tool comprises a slotted cutter bar 10, cutters 11, 12, follower clamping blocks 13, 14, an adjusting screw 15, an eccentric clamping pin 16, and threaded centering pins 17 and 18.

The adjusting screw 15 is provided with enlarged ends upon which oppositely disposed threads are cut, and an intermediate reduced portion or neck 19. The threads bear against a smooth unthreaded cylindrical wall formed at one end of the slot. The centering pin 17 is provided with a reduced end 20 which enters the space between the enlarged portions of the screw 15. This end 20 is of sufficient width to engage the adjacent faces of the enlarged portions of the screw 15 so that when the parts are in position the screw 15 is centered. The centering pin 17 is threaded at its outer end and screwed into a threaded bore formed in the bar 10 and extending in a direction at right angles to the adjusting screw 15, as clearly illustrated. When the pin 17 is in position the screw 15 cannot be shifted laterally with respect to the bar 10, but it is free to be rotated. At one end it is provided with square socket 21 for the reception of an adjusting key, by which the screw may be readily turned.

Directly above the screw 15 the cutters 11 and 12 are located. Each of these cutters is provided on its under surface with threads or teeth 22, which mesh with the threads upon the adjusting screw 15, the teeth or threads 22 upon cutter 12 being oppositely disposed to the teeth or threads upon the cutter 11. The cutters 11 and 12 are of sufficient width to snugly fit within the slot cut in the bar 10 and when in their innermost position preferably abut against each other, as clearly illustrated in Fig. 4. It will be seen that with this construction, a rotation of the adjusting screw 15 in one direction will cause the cutters 11 and 12 to move outward from the axis of the bar, and a rotation in the opposite direction will cause them to move inward.

In order to clamp the cutters 11 and 12 firmly in position and in order to apply a pressure throughout practically their entire length for all adjustments, I arrange the follower clamping blocks 13 and 14 so as to fill the slot when side by side in position, as illustrated, and at the same time extend the outer end of the block 13 to practically the outer cutting edge of the cutter 11, and the outer end of the block 14 to the outer cutting edge of the cutter 12. Each of the blocks 13 and 14 is provided with a projection 23 which engages a corresponding slot 24 in the upper edge of the cutters 11 and 12, the projection 23 on block 13 engaging the slot 24 of cutter 11, and the projection 23 of block 14 engaging the slot 24 of cutter 12. With this construction the follower blocks follow their respective cutters as they are moved to and fro, and by reason of the fact that they overlap each other and each extends over a portion of both cutters in all adjustments of the parts, the force applied by the clamping pin 16 is transmitted to all parts of the cutters 11 and 12. This provides a rigidity of construction and operation which is of great value. The upper edges of the blocks 13 and 14 are slightly beveled, as shown at 25, so as to provide a good fit between said blocks and the clamping pin 16. This pin, as clearly illustrated, fits within a circular opening formed at one end of the slot in the bar 10. The pin itself is slightly oval in cross-section, so that in one position it applies a clamping pressure upon the follower blocks 13 and 14 and in a position at right angles thereto removes such pressure and thereby allows the follower blocks and associated parts to be readily moved under the adjusting action of the screw 15. For the purpose of enabling the clamping pin 16 to be turned with a key, it is provided with a square socket 26, preferably at each end. The central portion of the pin 16 is reduced in diameter so as to provide squared shoulders between which the reduced end 27 of the centering pin 18 is adapted to fit. When this centering pin is in position the reduced portion 27 bears against the adjacent shoulders of the pin 16 and prevents its lateral movement while leaving it free for rotation. The pin 18 is similar in construction to the pin 17 and is provided with a threaded portion in addition to the reduced portion 27. The threaded portion is threaded into a threaded opening in the body of the bar 10. This opening extends at right angles to the clamping pin 16. Both pins 17 and 18 are provided with kerfs at their outer ends so as to be readily screwed into or out of position by the use of a screw driver.

With this construction it will be seen that when it is desired to adjust the cutters 11 and 12, it is only necessary to give the clamping pin 16 a quarter turn so as to remove the clamping pressure and then rotate the adjusting screw 15 to give the desired adjustment. When the particular diameter of cut is obtained, the clamping pin 16 is again rotated into clamping position and the parts are thereupon firmly and rigidly held in place in the bar 10. In case it is desired to remove the cutters the adjusting screw 15 may be rotated far enough to force the cutters 11 and 12 entirely out of the slot formed in the bar. This operation is necessary when the cutters are to be changed.

With this construction it will be seen that the cutters 11 and 12 are given great rigidity in all operative positions. The cutters themselves are supported throughout a considerable portion of their length by the adjusting screw 15, which itself bears against the adjacent circular wall of the slot of the bar, while the upper edge of each cutter is engaged by one follower block throughout practically the entire length of the cutter and also throughout a portion of its length by the other follower block. In addition to this, the follower blocks themselves are engaged throughout the entire width of the bar 10 by the clamping pin 16. In this way there is a maximum bearing between each of the parts which enter into the complete tool and great rigidity of construction is obtained, while at the same time maintaining a structure which is readily adjustable, simple, compact, efficient and neat in appearance and finish.

It will be apparent that a bar such as I have illustrated may be provided with a plurality of slots, such as shown, and such slots may be provided in each instance with its complement of cutters and associated parts. Such changes may be made in the structure disclosed as fall within the scope of the appended claims.

What I claim as new and desire to secure by Letters Patent of the United States is:

1. A boring tool including a main bar provided with a transverse slot, a pair of oppositely disposed cutters having oppositely disposed threads thereon, an adjusting screw having oppositely disposed threads for engaging the corresponding threads on said cutters and operative to move said cutters both outward and both inward in response to opposite rotation respectively of said adjusting screw, follower clamping blocks movable with said cutters as they are being adjusted, said blocks overlapping each other and each block bearing upon both of said cutters, an eccentric clamping pin bearing against said blocks and operative when rotated to force said blocks against said cutters, said cutters against said adjusting screw and finally said adjusting screw against the adjacent wall of said slot to hold all the parts firmly in position, and centering pins for said adjusting screw and clamping pin respectively.

2. A boring tool including a main bar provided with a transverse slot, a pair of oppositely disposed cutters having oppositely disposed threads at one edge thereof, an adjusting screw having coöperating threads for adjusting the cutters in and out in response to rotations of the screw, follower clamping blocks movable with said cutters